United States Patent [19]

Haller

[11] Patent Number: 5,178,948
[45] Date of Patent: Jan. 12, 1993

[54] METHOD AND APPARATUS FOR PRODUCTION OF RUBBER DISPERSIBLE PELLETS

[75] Inventor: Thomas M. Haller, Havre de Grace, Md.

[73] Assignee: J. M. Huber Corporation, Rumson, N.J.

[21] Appl. No.: 772,757

[22] Filed: Oct. 7, 1991

Related U.S. Application Data

[62] Division of Ser. No. 390,013, Aug. 7, 1989, Pat. No. 5,091,132.

[51] Int. Cl.$^5$ .............................................. B32B 5/16
[52] U.S. Cl. ................................ 428/402; 23/313 R; 264/117; 423/335
[58] Field of Search ..................... 428/402; 23/313 R; 264/117; 423/335

[56] References Cited

U.S. PATENT DOCUMENTS

| | | | |
|---|---|---|---|
| 2,758,039 | 8/1956 | Barbour | 264/117 |
| 3,532,473 | 10/1970 | Biegler et al. | 264/117 |
| 3,646,183 | 2/1972 | Topcik | 264/117 |
| 3,711,254 | 1/1973 | McGowan et al. | 23/313 R |
| 3,834,850 | 9/1974 | Takewell | 264/117 |
| 3,923,680 | 12/1975 | Roeder et al. | 264/13 |
| 4,008,064 | 2/1977 | Sakuli | 71/28 |
| 4,087,254 | 5/1978 | Takewell | 23/313 R |
| 4,108,932 | 8/1978 | Takewell et al. | 264/117 |
| 4,131,668 | 12/1978 | Sasaki et al. | 75/376 |
| 4,225,543 | 9/1980 | Hohman | 264/40.4 |
| 4,230,458 | 10/1980 | Takewell | 264/117 |
| 4,251,475 | 2/1981 | Varrasso et al. | 264/40.1 |
| 4,330,519 | 5/1982 | Takahashi et al. | 423/335 |
| 4,336,219 | 6/1982 | Lamond | 264/117 |
| 4,609,473 | 9/1986 | Ramachandran et al. | 23/313 R |
| 4,683,128 | 7/1987 | Orii et al. | 423/338 |
| 5,030,433 | 7/1991 | Mehrota | 423/335 |

Primary Examiner—Paul J. Thibodeau
Assistant Examiner—Mark Forman
Attorney, Agent, or Firm—Harold H. Flanders; Alec H. Horn; Robert L. Price

[57] ABSTRACT

A pelletized form of silica which is sufficiently dust free and highly dispersible in rubber formulations. The pelletized silica is produced by a process which involves pelletizing a mixture of silica and water in an inclined mixer and drying the pelletized product in a fluidized bed dryer.

3 Claims, 5 Drawing Sheets

METHOD AND APPARATUS FOR PRODUCTION OF RUBBER DISPERSIBLE PELLETS

This application is a divisional application of application Ser. No. 07/390,013, filed Aug. 7, 1989 now U.S. Pat. No. 5,091,132.

TECHNICAL FIELD

The present invention relates to an apparatus and process for producing pelletized pigments, fillers, reinforcement agents and similar rubber additives, and more particularly relates to methods and apparatus for producing dust-free pelletized silica which is highly dispersible in rubber compositions.

BACKGROUND ART

Rubber additives such as pigments, fillers, reinforcement agents, processing aids and the like are generally processed to be highly dispersible in rubber compositions. In the past, such additives were made highly dispersible by being formed into fine powders. These fine powders, although meeting the requirements of being easily dispersible, pose significant problems in handling and may potentially cause health problems for workers who are exposed to the dust products of these materials.

The use of silica additives has become increasingly important to the rubber industry. Silica, which may be in the form of silica pigments, is commonly used in the rubber industry to provide reinforcing and stiffening properties to various types of rubber compositions. Additionally, incorporating silica into rubber compositions has been found to be advantageous in that such compositions do not deteriorate under heating as rapidly as do most other rubber additives.

Silica in a free flowing powder form will disperse readily into rubber compounds. However, when utilizing conventional silica products, their dustiness becomes a problem due to the handling and compounding of rubber formulations. Concerns by manufacturers who utilize any small particle size material, such as silica pigment, have led to the development of more dust-free forms of such products.

The most common method used to reduce the dustiness of compounds is particle agglomeration or pelletization. A pelletized product is easily handled in a production environment and creates little dust.

A pelletized version of precipitated silica will minimize dust problems and facilitate handling and therefore would be highly desirable to rubber manufacturers. However, there remains an important requirement that such a pelletized form of the silica must break down and redisperse in the powder form. Attempts to improve silica products for use in rubber manufacturing include chemically treating silica in order to affect good dispersibility. Heretofore an acceptable dust-free, highly dispersible pelletized form of rubber additive, particularly silica, has not been developed for the rubber industry.

The present invention addresses the need of a dust-free, highly dispersible pelletized form of silica and is directed to a unique process and apparatus by which such silica may be produced.

DISCLOSURE OF THE INVENTION

It is accordingly one object of the present invention to provide for a form of easily dispersible, dust-free rubber additives for use in rubber compounding operations.

A further object of the present invention is to provide a pelletized silica product.

Another object of the present invention is to provide a pelletized form of silica which is highly dust-free and easily dispersible in rubber formulations.

A still further object of the present invention is to provide methods and apparatus for producing dust free, highly dispersible rubber additives.

An even further object of the present invention is to provide a method for producing a pelletized silica product.

According to the present invention there is provided a method for producing dust free pelletized silica products which incorporates a novel mixing operation for formation of the silica pellets. Additionally, the present invention provides for a specific drying operation used in conjunction with the mixing operation whereby the pelletized silica is formed having the desired properties. The invention also provides an apparatus for forming the pelletized silica.

With these and other objects in view, the present invention will be better understood from the description and the claims which follow hereafter taken with reference to the annexed drawings.

BRIEF DESCRIPTION OF DRAWINGS

The present invention will now be described with reference to the annexed drawings, which are given by way of non-limiting examples only, in which.

BEST MODE FOR CARRYING OUT THE INVENTION

The present invention is directed to a method and apparatus for producing pelletized rubber additives, particularly pelletized silica. The pelletized silica produced by the present invention is sufficiently dust-free to be easily dispersible in rubber compound formulations.

In developing the pelletized silica of the present invention various mixing, pelletizing and drying processes and apparatus were experimentally evaluated. Accordingly, it was discovered that only the disclosed, highly selective process and apparatus of the present invention was able to produce pelletized silica which was sufficiently dust-free and highly dispersible to be used in rubber compounding mixtures.

By utilizing a combination of an inclined mixer and a fluidized bed dryer and properly controlling the process variables and parameters as discussed in detail below, a pelletized silica product having less than 0.8% dust contents and being highly dispersible in rubber compounding mixtures was produced. This pelletized silica product has a density between about 0.25 and about 0.40 g/cc, and average particle size between about 40 and about 80 mesh, and a moisture content of less than about 10% by weight.

The pelletized product is produced from a feed of amorphous silica in any form such as slurry, wet cake, dry particles, etc. To produce the pelletized product amorphous silica is combined with a solvent, such as water to form a slurry and pelletized in an inclined mixer. As discussed in detail below, the above properties of the final pelletized silica product are controlled by controlling a particular combination of process variables including the percentage of solvent in the mixer, the mixing speed and mixing time.

The pelletized silica produced in the inclined mixer is discharged from the mixer and conveyed to a vibrating fluidized bed dryer in which it is dried so as to have a moisture content below 10% by weight.

Figure 1:
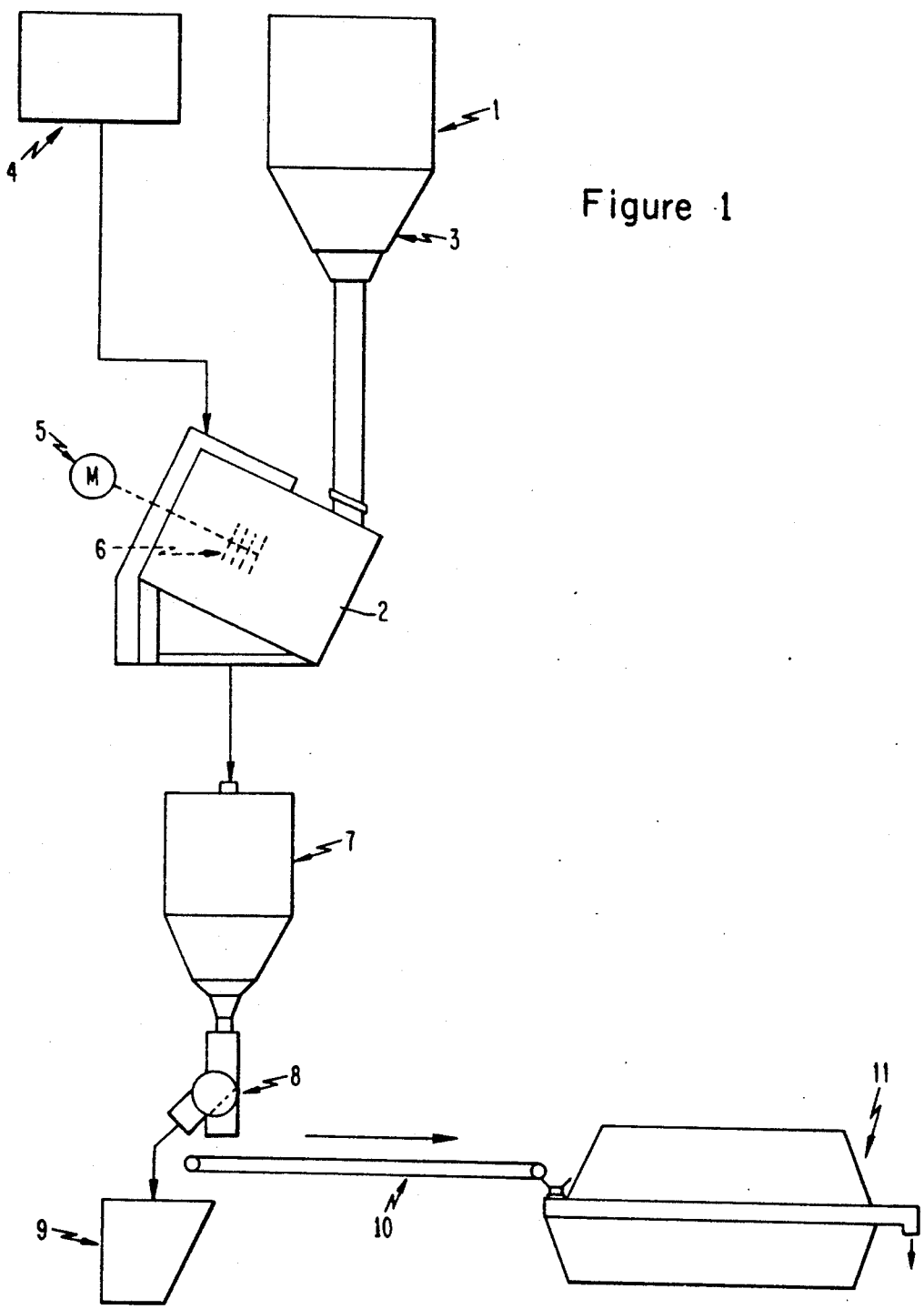
FIG. 1 is a diagram illustrating the method and apparatus used in one embodiment of the present invention.

FIG. 1 is a diagram which illustrates a preferred embodiment of the method and apparatus used for producing pelletized silica according to the present invention. As illustrated in FIG. 1, amorphous silica is fed from a suitable supply means 1 to mixer 2. For illustrative purposes FIG. 1 depicts an embodiment wherein dry amorphous silica is fed from a hopper having a vibrating discharge means 3. However, for purposes of the present invention any form of amorphous silica may be utilized as a feed material including a slurry, spray dried form, milled particles, wet cakes, etc. The only limiting parameter as regards the form of the amorphous silica feed, as will be discussed below, is the amount of solvent which is combined together with the amorphous silica feed in mixer 2.

Whereas FIG. 1 illustrates a supply and feed means suitable for use with a dry form of amorphous silica, when using other forms of amorphous silica such as a slurry, wet cake, etc., conventional means and equipment required for supplying such feed could be easily incorporated.

In addition to receiving the amorphous silica feed, mixer 2 also receives a solvent feed from solvent source 4 which, as illustrated, may be a conventional supply tank connected by a suitable flow metering means to mixer 2. In the pelletization of amorphous silica as further discussed below, water was supplied and used as the solvent.

As illustrated in FIG. 1, mixer 2 is an inclined, high intensity mixer. A number of types of mixers were tested during the course of the present invention and found to be unacceptable in that a highly dispersible product could not be produced. In varying all possible operational parameters such as percent solvent, mixing speed, residence time, etc. it was found that the proper product characteristics, i.e. dispersability and dustiness, could only be achieved utilizing an inclined, high intensity mixer as illustrated in FIG. 1. A particularly suitable inclined mixer for the present invention is an inclined mixer in which both the mixer tank and stirrer are rotated in the same or opposite directions. In this regard, an Eirich mixer, model R-18, as described in AUFBEREITUNGS-TECHNIK No. 12/75, incorporated herein by reference, was found to be particularly suitable for purposes of the present invention.

The inclined mixer was found to be versatile enough to produce pellets of different sizes and densities consistently with minimal operator involvement. Three main independent variables which were found effective to produce pellets of different densities and sizes included the percent of solvent added to the total batch weight, the rotor speed of the mixer and the peak current requirements of the mixer motor during a batch operation. Suitable solvents include liquids capable of forming suspensions with the material to be pelletized. In a preferred embodiment water was utilized as the solvent for pelletizing silica.

Figure 2:
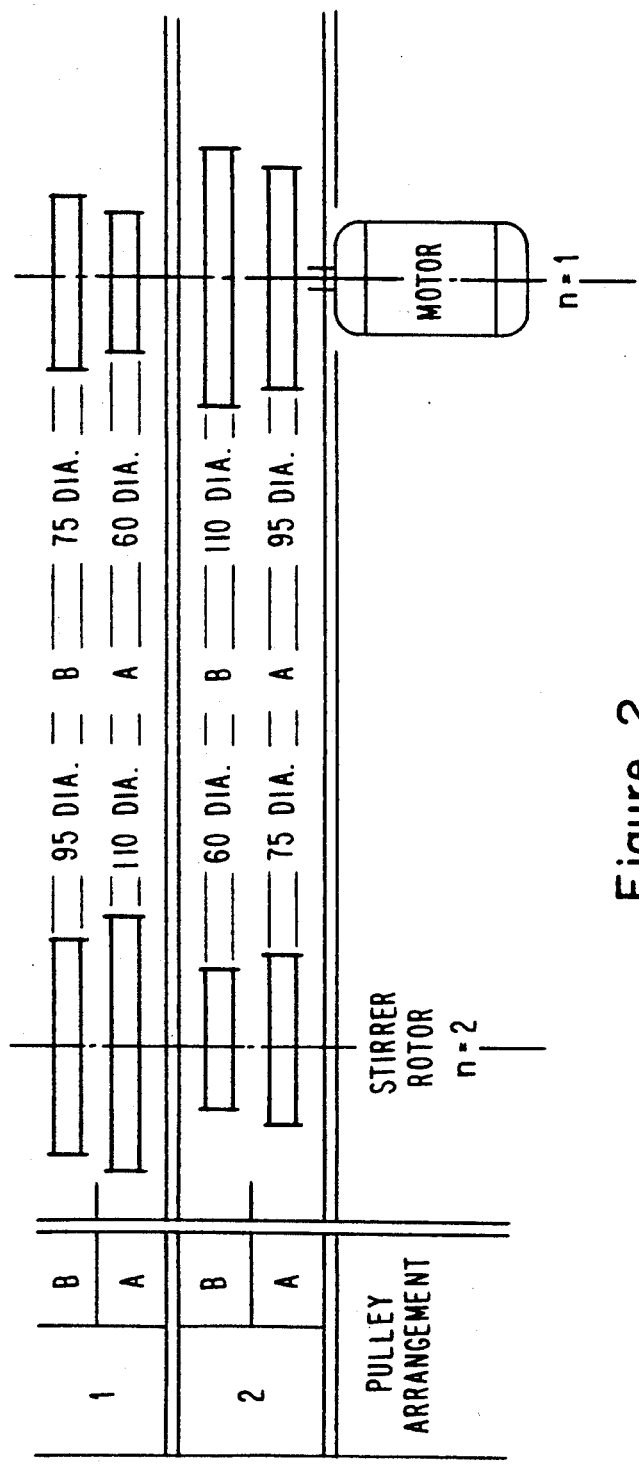
FIG. 2 is a schematic diagram illustrating a pulley arrangement utilized in conjunction with one embodiment of the present invention.

It was discovered that the rotational speed of the mixer was directly related to the density of the pellets produced. Control of the speed of the mixer was achieved during the present invention by incorporating a pulley arrangement which is schematically illustrated in FIG. 2. As illustrated in FIG. 2, the pulley configuration included four pairs of pulleys that were positioned between the rotor of motor 5 and the rotor of stirrer 6. Aligned pairs of pulleys between the stirrer rotor, $n_2$ and the rotor $n_1$ had the following diameters respectively 95 in: 75 in; 110 in: 60 in; 60 in: 110 in and; 75 in: 95 in. These pairs of pulley diameters allowed for reduction ratios of 0.789, 0.545, 1.833 and 1.266. The combinations of pulley pairs are referenced by 1B, 1A, 2B and 2A as illustrated in FIG. 2. This pulley arrangement allowed for multiple configurations of pulleys between the two rotors of motor 5 and stirrer 6 as illustrated. The faster the tip speed of the stirrer rotor or rotor rpm, which is related to a particular pulley configuration, the higher the density of the pellet products. Table 1 below lists the rpm and tip speeds for various pulley configurations utilizing a star-type stirring tip.

TABLE 1

RPM AND TIP SPEEDS FOR ROTORS 1 AND 2 FOR DIFFERENT PULLEY CONFIGURATIONS

| Pulley Arrangement | Pulley dia. (in.) Motor | Pulley dia. (in.) Stirrer | Reduction | Motor Speed RPM | Stirrer Rotor RPM | Tip Speed (m/sec) |
| --- | --- | --- | --- | --- | --- | --- |
| 1A | 60 | 110 | 0.545 | 880 | 480 | 3.9 |
| 1A | 60 | 110 | 0.545 | 1760 | 960 | 7.8 |
| 1B | 75 | 95 | 0.789 | 880 | 695 | 7.8 |
| 1B | 75 | 95 | 0.789 | 1760 | 1389 | 11.3 |
| 2A | 95 | 75 | 1.266 | 880 | 1115 | 9.0 |
| 2A | 95 | 75 | 1.266 | 1760 | 2230 | 18.1 |
| 2B | 110 | 60 | 1.833 | 880 | 1615 | 13.1 |
| 2B | 110 | 60 | 1.833 | 1760 | 3225 | 26.2 |

Although for purposes of the present invention rotor speed was controlled by a combination of multiple rotors having different pulley configurations, suitable control of rotor or tip speed could also be achieved by utilizing a conventional variable speed motor connected to the stirrer 6.

It was found during the course of the present invention that the percent of solvent utilized in a particular batch was inversely related to the density of the pellets produced. In this regard it was discovered that larger percentages of solvent produced pellets having lower densities. Additionally, it was discovered that the percentage of solvent of a particular batch mixture mixed at a particular mixing speed, i.e. a particular pulley configuration, was also inversely related to the time of the batch. Thus, higher solvent percentages produced acceptable products in shorter time periods. Table 2 below lists the variables which were found to effect the density of the pellets for a particular batch. As shown in Table 2, a density greater than 0.37 g/cc could have been achieved by using the 2B pulley arrangement, by using a lower percentage of water, and by using a longer batch time. However, for purposes of the present invention it was decided that a maximum batch time should be 30 minutes. As noted in Table 1, water was utilized as the preferred solvent in the present invention where producing pelletized silica. However, other liquid solvents capable of forming suspensions with the material to be pelletized could also be utilized.

TABLE 2

Mixing Variables and Resultant Densities of Pelletized Silica

| | Pulley Arrangement | | | |
|---|---|---|---|---|
| | 2B | 2B | 1A | 1A |
| % Water | 66 | 56 | 69 | 64 |
| Time (min) | 2 | 30 | 2 | 30 |
| Density (pour, g/cc) | .28 | .37 | .25 | .29 |
| Current (amps) | 2.4 | 2.4 | 1.8 | 1.8 |

In utilizing the combination of pulley configurations to control the rotational speed of the rotor it was discovered that the size of the pellets was functionally related to the amperage drawn by the rotor motor 5 during a given batch run. In this regard the size of the pellets was directly related to the amount of current drawn such that larger sized pellets were produced at higher amperages. In order to effectively monitor the relationship between the amperage drawn by the motor and the size of the particles during a given batch operation an ammeter connected to the motor 5 was continuously monitored until the desired amperage was reached for a particular particle size. When the desired amperage was reached the batch operation was stopped and the particle size of the pellets was measured.

Table 3 below illustrates the effect of amperage on particle size. As shown in Table 3, at an ammeter reading of 2.2 a majority of the pellets were formed on a 40 mesh screen (61.9%). When the motor was allowed to reach an ammeter reading of 2.3 amps, the majority of the pellets were found on the 20 mesh screen (50.7%). If, however, the batch was stopped after the ammeter reading was 2.1 amps, then a large percentage of the pellets were found on the smaller 80 mesh screen (41.1%).

TABLE 3

Amperage vs. Mesh Size of Pelletizing Silica

| | Amperate | | |
|---|---|---|---|
| Mesh Size (%) | 2.1 | 2.2 | 2.3 |
| 6 | .3 | .6 | 5.2 |
| 10 | 1.1 | 1.7 | 29.3 |
| 20 | 9.8 | 9.1 | 50.7 |
| 40 | 40.1 | 61.9 | 10.2 |
| 80 | 40.1 | 22.7 | 3.6 |

TABLE 3-continued

Amperage vs. Mesh Size of Pelletizing Silica

| | Amperate | | |
|---|---|---|---|
| Mesh Size (%) | 2.1 | 2.2 | 2.3 |
| 200 | 8.5 | 3.9 | .8 |
| pan | .2 | .2 | .3 |

Batch Conditions: 66% water, 2B pulley arrangement, 2-2.5 min.

This relationship between the ammeter readings and the particle size indicates a definite shift to a small sized pellet distribution for lower ammeter readings. The amperage required for a particular pellet size varies for different pulley or rotor configurations as further shown in Table 2 above.

As discussed above, a property specifically required by the pelletized silica was that it be easily dispersible in rubber compounding mixtures. To test dispersability, an experimental matrix of samples was utilized which consisted of different densities, in three different mesh sizes, $6 \times 10$, $10 \times 20$, and $20 \times 40$ as listed in Table 4. Nine of the samples were subjected to a dispersion test into a rubber with a Banbury Mill. These samples were quantitatively evaluated and ranked from best dispersion to worst, i.e., from 1 through 11 utilizing two ranking schemes A and B. Some of these samples were also dispersed utilizing a two roll mill with the same rubber formulation as that tested with the Banbury Mill. The results of these tests are listed in Table 4 below.

TABLE 4

Dispersion, Size, and Density Data of Pelletized Silica

| DENSITIES (g/cc) | | | MESH SIZE | BANBURY MILL DISPERSION RESULTS | | TWO ROLL MILL DISPERSION RESULTS |
|---|---|---|---|---|---|---|
| 16 × 18 | POUR | PACK | | RANK A | RANK B | |
| .25 | .27 | .29 | 6 × 10 | 9 | 3 | 4 |
| .25 | .29 | .31 | 10 × 20 | 10 | 6 | — |
| .25 | .29 | .32 | 20 × 40 | 9 | 1 | — |
| .32 | .37 | .40 | 6 × 10 | 8 | 8 | 6 |
| .32 | .37 | .40 | 10 × 20 | 10 | 7 | 6 |
| .32 | .36 | .39 | 20 × 40 | 10 | 9 | — |
| .23 | .25 | .28 | 10 × 20 | 9 | 4 | 4 |
| .28 | .29 | .31 | 6 × 10 | 10 | 5 | 10 |
| .28 | .30 | .33 | 10 × 20 | 10 | 10 | 6 |
| .25 | .29 | .31 | 10 × 20 | 10 | 2 | — |
| .32 | .37 | .40 | 10 × 20 | 10 | 11 | — |
| .23 | .25 | .27 | 6 × 10 | — | — | 2 |
| .23 | .25 | .29 | 20 × 40 | — | — | 3 |
| .27 | .29 | .32 | 20 × 40 | — | — | 6 |

Figure 3:
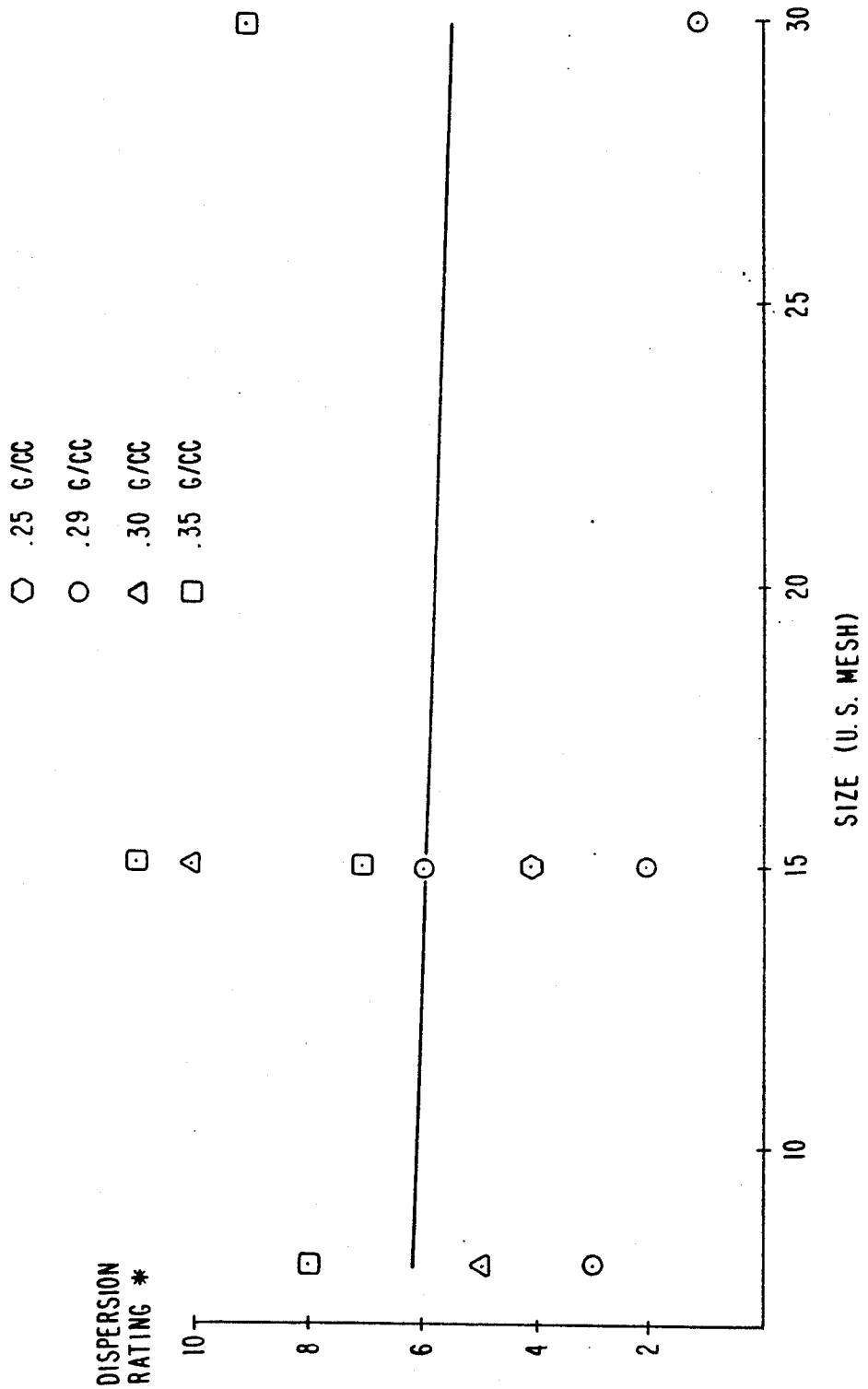
FIG. 3 is a graphical illustration of the relationship between the particle size of the pelletized silica and the dispersion rating of the product.

In FIG. 3 the size of the pellets are graphed vs. their dispersion utilizing the rating results. As seen from FIG. 3 the graph showed no correlation between pellet size and dispersion, indicating that the of size of the pellets had no effect on the dispersion properties.

Figure 4:
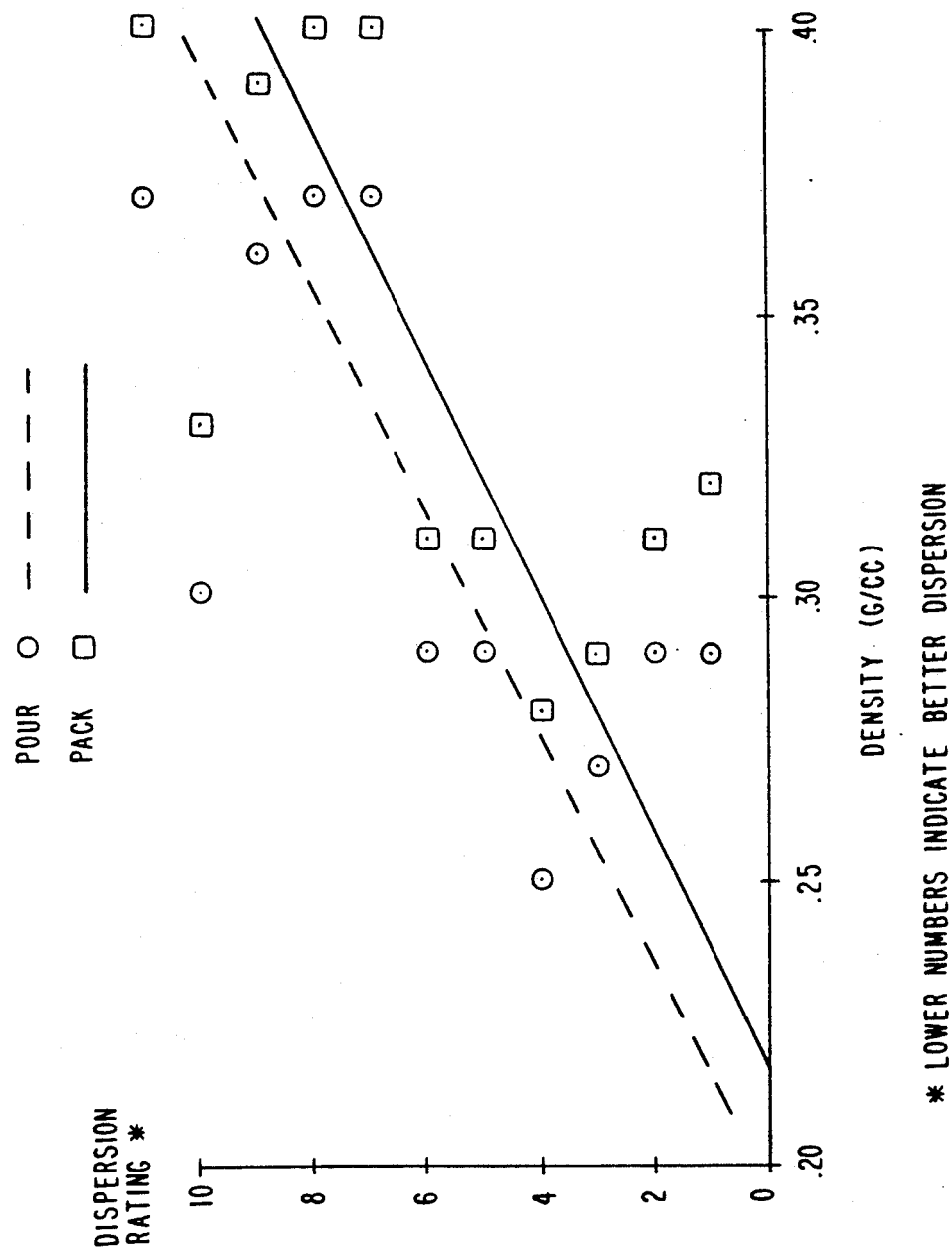
FIG. 4 is a graphical illustration of the relationship between the density of the pelletized silica and the dispersion rating of the product.
Figure 5:
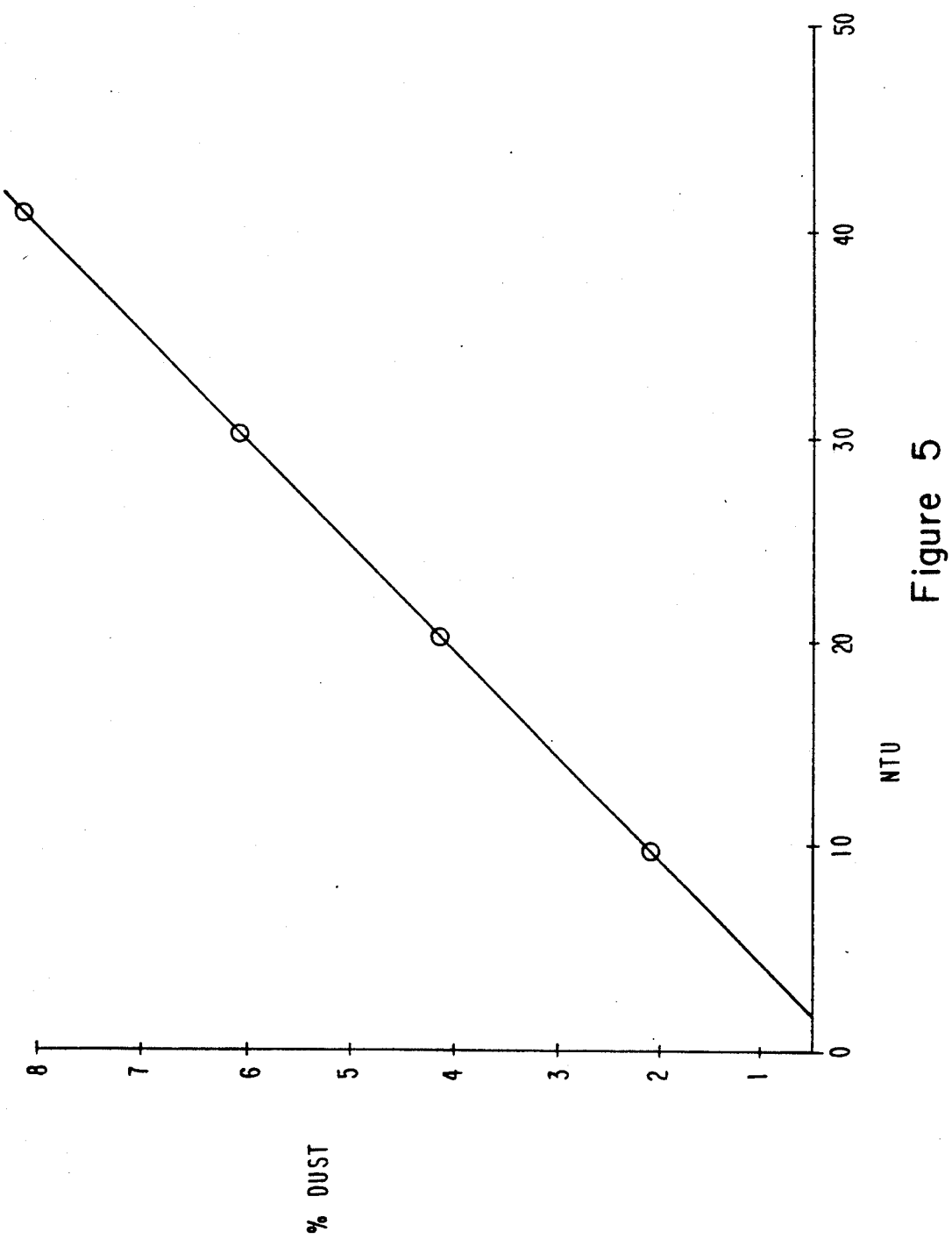
FIG. 5 is a graphical illustration of the relationship between the nephelometric turbidity of a pelletized silica and the product's dust percentage.

In FIG. 4 the density of the pellets are graphed vs. their dispersion ratings. As illustrated in FIG. 4 the results show a correlation that indicates a direct effect of density on dispersion such that the higher the density, the poorer the dispersion. This correlation was not observed in instances where a majority of the samples were rated as poorly dispersible as in ranking scheme A. An unexpected result of this test was that the two roll mill dispersed the pelletized silica better than the Banbury Mill.

One suspected variable affecting the pellet dispersion was the salt content of the silica. In order to investigate this possible effect of salt content on dispersion, pellets were made with various amounts of $Na_2SO_4$ and subjected to dispersion tests. The results of this study are illustrated in Table 5 below which shows that the results of this investigation were inconclusive. While the lowest amount of sulfate (0.5%) did produce the lowest dispersion (4) this dispersion was far from what was anticipated. Furthermore, no direct correlation between the amount of sulfate and the dispersion rating was observed. It was therefore concluded that the amount of sulfate in a regular batch of amorphous silica was not related to dispersability onto rubber compositions.

TABLE 5

% Sulfate and Dispersion Ratings for Pelletized Silica

| % Sodium Sulfate | Dispersion Rating (Two Roll Mill) |
|---|---|
| 0.5 | 4 |
| 2.0 | 6 |
| 3.8 | 5 |

Batch Conditions: 66% water, 2B pulley arrangement, 2.5 min., 2.4 amps.

Besides dispersion, the quantity of dust associated with the product was the next important consideration regarding the pelletized silica. Dust is defined as silica pellets less than 200 mesh size. Previous work on dust tests defines it as the material capable of being suspended in water with larger sizes settling out.

For purposes of this invention the following test was developed which measured the suspension of dust in water with a HACH ratio turbidimeter. A standard graph was first developed in which a 1 gram sample of ground-up amorphous silica pellets were suspended in one liter of water. Four different aliquots of the sample were then diluted to 100 millimeters. Each sample was placed in a HACH ratio turbidimeter and nephelometric turbidity units (NTU's) were read after five minutes. The NTU readings were then plotted vs. percentage of dust to give a standard graph.

The percent of dust was then calculated based on 5 grams of sample and 60 grams of diluent water. According to the devised dust test procedure, five grams of pelletized silica were placed into an Erlenmeyer flask containing 60 grams of water. The mixture was slowly stirred for 15 seconds, then allowed to stand for an additional 5 seconds. The resulting supernatant was then poured into a turbidimeter sample cell and nephelometric turbidity units (NTU's) were read after five minutes. The percent of dust of the apelletized silica was read off of the standard graph discussed above. The results are listed in Table 6 below.

TABLE 6

| ml of 1% solution | NTU's | % Dust |
|---|---|---|
| 17 | 9.8 | .204 |
| 34 | 20 | .41 |
| 51 | 30 | .61 |
| 68 | 41 | .82 |

Once it was determined that the inclined mixer was capable of producing pelletized silica having suitable dispersion capabilities and acceptable dust levels, it was necessary to provide a suitable process for drying the pelletized silica.

As illustrated in FIG. 1 the pelletized silica products from mixer 2 leave the mixer and enter into discharge hopper 7 which includes a suitable discharge means 8. The discharge means 8 directs undesired products to a suitable collector 9 and transfers desired products to a conveyor means 10. Conveyor means 10 then transfers products to a dryer 11 which, for purposes of the present invention, includes a fluidized bed dryer.

It has been found for purposes of the present invention that the moisture content of the silica pellets formed in mixer 2 should have a moisture content of between about 60 and 68 percent water by weight. The pellets are then dried in the fluidized bed dryer at a temperature greater than about 75° C. to a moisture content of about 5% by weight. In a preferred embodiment a vibrating fluidized bed dry was found to be particularly useful for purposes of the present invention.

The present invention thus allows for the production of pelletized silica having a pour density between about 0.20 and about 0.50 g/cc, and more preferably between about 0.25 and about 0.37 g/cc and an average particle size between about 30 and about 150 mesh, and more preferably between about 40 and about 80 mesh. Additionally, the pelletized silica contains between about 0.1% and about 0.9% dust, and more preferably between about 0.2% and about 0.8% dust.

These properties of the pelletized silica product are controlled according to the present invention by utilizing an inclined mixer in which to pelletize the silica end by controlling the percent of solvent added to the silica charge in the mixer, the mixing speed of the stirrer and the batch time. In particular, the percent of solvent is between about 40 and about 75% by weight and more preferably between about 56 and about 69% by weight. The mixing speed of the stirrer is between about 400 and about 3500 RPM, and more preferably between about 480 and about 3225 RPM. Finally, the batch time in the mixer is 30 minutes or less.

As described in detail above the present invention is directed to a process for producing pelletized materials, particularly silica, which are highly dispersible in rubber formulations. This pelletizing process involves producing the pelletized materials in an inclined mixer and drying the pelletized products in a fluidized bed dryer. For purposes of the present invention an Eirich mixer was utilized as a preferred mixer.

As discussed above, the present invention is particularly concerned with producing a highly dispersible pelletized product. In this regard it was discovered that the dispersability of the pelletized products could be controlled by controlling the density of the pelletized products formed in the inclined mixer. The density of the pelletized products was controlled by controlling the amount of solvent added to the mixer during the pelletization operation and also by controlling the mixer speed.

The pelletization process can be used for a variety of rubber compounding materials including fillers, reinforcing agents, processing aids, pigments and mixtures thereof. However, the inventive process was particularly found to be useful for producing pelletized amorphous silica.

In producing pelletized amorphous silica according to the present invention amorphous silica is combined in the incline mixer with between about 55 and about 75% water as a solvent, by weight. After pelletization in the inclined mixer the pelletized silica is dried in the fluidized bed dryer to a moisture content below about 10% by weight. Although it was discovered that the size of the pelletized product did not affect the dispersability, the pelletized silica produced was controlled to have an average particle size between about 20 and about 80 mesh. According to the present invention it was discovered that the dispersability of the pelletized silica was a function of the density thereof. Accordingly, pelletized silica was controlled during the processing to have a density of between about 0.25 and about 0.40 g/cc.

In addition to the above process the present invention particularly is directed to a novel form of pelletized amorphous silica which is highly dispersible in rubber formulations and is substantially dust free.

The following example is presented to illustrate the invention which is not intended to be considered as being limited thereto. In the examples and throughout percentages are by weight unless otherwise indicated.

EXAMPLE 1

In this example amorphous silica was mixed with 66% by weight of water in an Eirich mixer model R-18 whose rotor rpm was 3,225 m/sec. The mixing operation produced pelletized silica having a particle size of between 20-30 mesh (U.S. standard) at a 60% yield with the mixer's motor amperage reaching 2.4 amps. The pellets were dried in a fluidized bed dryer operating at 80° C. at a rate of 22.9% weight loss per hour of moisture to give a highly dispersible product. It was found in this example that the dispersion was progressively hindered by increasing the density of the pellets, by slowing the rate of drying or by increasing the drying temperature.

EXAMPLE 2

In this example the mixer of FIG. 1 was charged with 620 pounds of water from the solvent source 4. The solvent was mixed with a 290 pound charge of amorphous silica from the silica hopper. The mixer operated at 7 batches per hour or at about 8.57 minutes per batch. Properly sized pelletized product having a 68% moisture content by weight was discharged onto the conveyor means and fed into the fluidized bed dryer at a rate of 6375 pounds per hour and dried to form the final product.

From the above examples it is seen that the pelletized products of the present invention are characterized as having superior dispersion properties together as well as a low percentage of dust and are easily produced by controlling process variables.

Although the invention has been described with reference to particular means, materials and embodiments, from the foregoing description one skilled in the art can ascertain the essential characteristics of the present invention and various changes and modifications may be made to adapt the various uses and characteristics thereof without departing from the spirit and scope of the present invention as described in the claims that follow.

I claim:

1. A silica product which is highly dispersible in rubber formulations comprising pellets of amorphous silica having a density between about 0.25 and about 0.40 g/cc said silica product containing between about 0.2% and 0.8% particles which are less than 200 mesh.

2. A silica product according to claim 1, wherein said pelletized silica has an average particle size between about 20 and about 80 mesh.

3. A silica product according to claim 1, wherein said pelletized silica has a moisture content below about 10 percent by weight.

* * * * *